United States Patent
Hirai

(10) Patent No.: US 8,264,844 B2
(45) Date of Patent: Sep. 11, 2012

(54) ELECTRONIC APPARATUS

(75) Inventor: Koji Hirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 12/819,153

(22) Filed: Jun. 18, 2010

(65) Prior Publication Data

US 2011/0007485 A1    Jan. 13, 2011

(30) Foreign Application Priority Data

Jul. 8, 2009   (JP) ................. 2009-161849

(51) Int. Cl.
*H05K 5/00* (2006.01)
*H05K 7/00* (2006.01)
*H05K 1/18* (2006.01)
*H05K 7/18* (2006.01)
*H05K 1/00* (2006.01)
*H05K 1/09* (2006.01)
*H05K 9/00* (2006.01)
*G03G 15/00* (2006.01)

(52) U.S. Cl. ........ 361/753; 361/752; 361/757; 361/760; 361/762; 361/777; 361/799; 361/800; 174/250; 174/251; 174/350; 399/3; 399/90

(58) Field of Classification Search .......... 361/736–820; 174/250–268, 350, 220; 399/3, 12–13, 75, 399/90
See application file for complete search history.

(56) References Cited

U.S. PATENT DOCUMENTS

| | | | |
|---|---|---|---|
| 5,892,669 A * | 4/1999 | Shin ............................... | 363/50 |
| 6,473,285 B1 * | 10/2002 | Schlenz et al. ................ | 361/112 |
| 2006/0034633 A1 * | 2/2006 | Tsusaka et al. ............... | 399/107 |
| 2009/0109584 A1 * | 4/2009 | Jones et al. .................... | 361/56 |

FOREIGN PATENT DOCUMENTS

JP   2006-100711   4/2006

* cited by examiner

*Primary Examiner* — Jayprakash N Gandhi
*Assistant Examiner* — Jerry Wu
(74) *Attorney, Agent, or Firm* — Fitzpatrick, Cella, Harper & Scinto

(57) ABSTRACT

A conductive chassis plate faces a printed circuit board at a distance. One end of the conductive chassis plate is aligned with one end of the printed circuit board. One end of the conductive chassis plate is electrically connected to a ground wiring pattern provided on one end of the printed circuit board. One end of the conductive chassis plate is electrically connected to a conductive member that extends from one end of the conductive chassis plate toward the other end. As a result, in transmitting or receiving a signal with respect to external equipment attached to a connector, an influence of electrostatic discharge is reduced with a simple configuration.

7 Claims, 11 Drawing Sheets

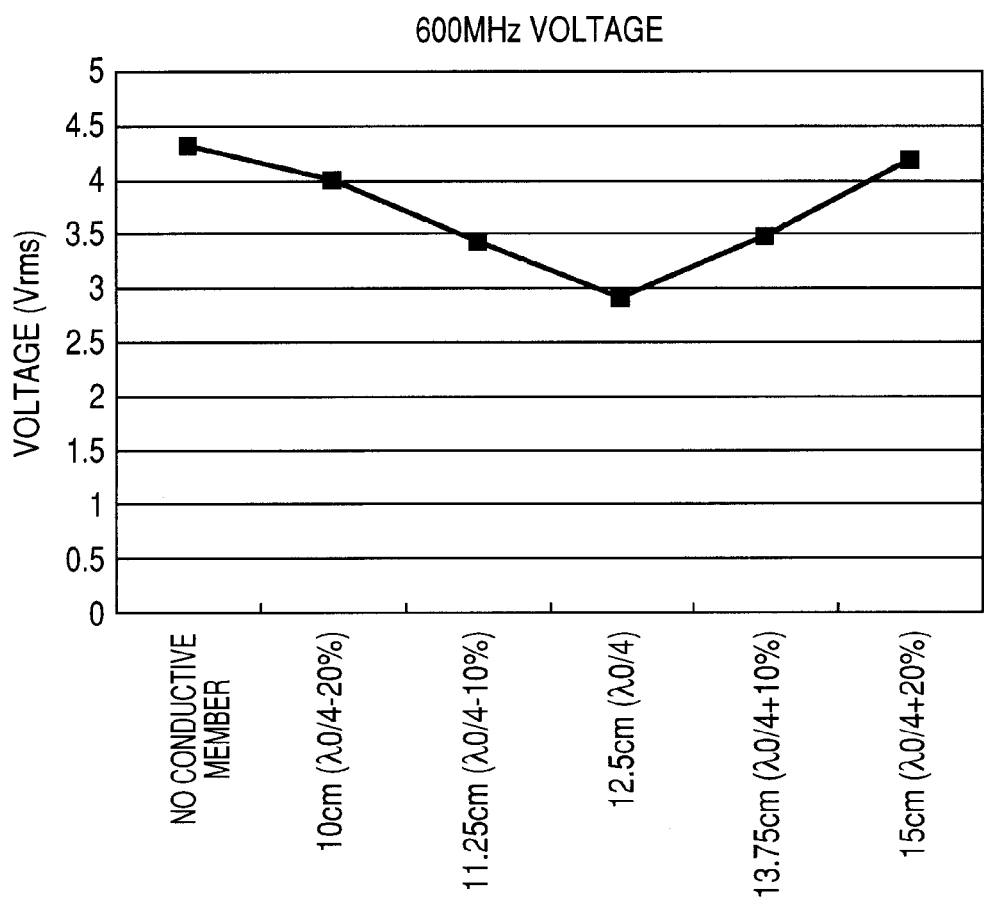

ELECTRONIC APPARATUS

BACKGROUND OF THE INVENTION

1. Field of the Invention

The present invention relates to an electronic apparatus in which connectors are mounted on both ends of a printed circuit board, respectively. In particular, the present invention relates to an electronic apparatus with a structure that reduces an influence of electrostatic discharge in transmitting or receiving a signal with respect to external equipment connected to each of the connectors.

2. Description of the Related Art

An image forming apparatus that is an example of the electronic apparatus generally includes an operating device configured to be operated by a user. The operating device of this type includes a printed circuit board housed in a case, and a conductive chassis plate disposed below the printed circuit board, in which the printed circuit board is grounded to the conductive chassis plate (see Japanese Patent Application Laid-Open No. 2006-100711). When static electricity charged on a human body is discharged to the operating device, the static electricity that has entered the printed circuit board is allowed to escape to the conductive chassis plate. In the grounded structure, portions of the conductive chassis plate corresponding to corners (four corners) at both ends of the printed circuit board are bent upward to form projecting portions, and the projecting portions are electrically connected to ground wiring patterns at the corners of the printed circuit board with conductive screws or the like. With the grounded structure, the printed circuit board is supported to the conductive chassis plate.

Further, in order to upsize the operating device supporting multiple functions and improve the operability, there has been known an operating device provided separately from an apparatus main body of the image forming apparatus. A bar-shaped conductive support member is projected from the apparatus main body, and the support member is connected to a vicinity of a central portion of a lower surface of the conductive chassis plate to support the operating device. A length of one side of the conductive chassis plate needs to be set to be equal to or larger than a length of the printed circuit board so that the printed circuit board is grounded. However, from the viewpoint of saving the space, the length of one side of the conductive chassis plate is generally set to be equal to the length of the printed circuit board.

In recent years, because needs to transfer data directly with respect to external equipment such as a memory media and not through a computer terminal are increased, there has been proposed a structure in which connectors for connecting the external equipment to both ends of the printed circuit board are provided. For example, a connector into which a memory media such as a card type memory is detachably inserted is mounted on one end of the printed circuit board, and a connector into which a memory media such as a USB memory is detachably inserted is mounted on the other end of the printed circuit board. Each signal terminal of those connectors is connected to an IC mounted on the printed circuit board by a wiring pattern. Those connectors for the memory media enable data within the memory media to be read directly and not through the computer terminal, to thereby form an image on a sheet. Further, those connectors enable an image to be read from an image reading device of the image forming apparatus, and enable data to be saved directly in the memory media and not through the computer terminal.

On the above-mentioned printed circuit board, a portion at which static electricity is liable to be discharged from the external is covered with an insulator to block the entrance of static electricity. Further, because the connector to and from which the external equipment is attachable and detachable from the external of a casing is mounted on each end of the printed circuit board, there is a fear in that static electricity is discharged from each connector. For that reason, each connector is configured to allow static electricity to flow in the ground wiring pattern of the printed circuit board so that static electricity is prevented from directly entering the IC from the connector.

However, even if static electricity is allowed to flow into the ground wiring pattern of the printed circuit board in the connector mounted on the other end of the printed circuit board, the connector mounted on one end of the printed circuit board may be affected by electrostatic discharge. Specifically, when the user executes the attachment/detachment work of the external equipment with respect to the connector mounted on the other end of the printed circuit board, static electricity is applied to the connector. An electrostatic discharge pulse that has been applied to the connector mounted on the other end of the printed circuit board flows toward one end of the printed circuit board through the ground wiring pattern of the printed circuit board, and flows into the conductive chassis plate from one end of the printed circuit board. In this case, one end of the conductive chassis plate functions as an open end with respect to the applied electrostatic discharge pulse, and a large voltage fluctuation occurs. Further, because one end of the conductive chassis plate and one end of the printed circuit board are aligned and electrically connected to each other at the projecting portion, those ends come close to each other. Likewise, a large voltage fluctuation occurs at one end of the printed circuit board. When the external equipment is connected to the connector mounted on one end of the printed circuit board, there is a fear in that the voltage fluctuation affects the transmission or reception of the signal with respect to the external equipment.

To cope with this problem, a method of inserting a static electricity countermeasure component such as a diode or a varistor into a signal wire that is liable to be affected by static electricity has been proposed. However, this method suffers from problems such as an increase in the component costs and a reduction in the package density on the printed circuit board. Therefore, another countermeasure has been desired.

SUMMARY OF THE INVENTION

It is an object of the present invention to provide an electronic apparatus that can reduce an influence of electrostatic discharge with a simple configuration.

According to the present invention, there is provided an electronic apparatus in which connectors to and from which external equipment is attachable and detachable are mounted on both ends of a printed circuit board, respectively, and which transmits or receives a signal with respect to the external equipment connected to the connector. The electronic apparatus includes: a conductive chassis plate that faces the printed circuit board at a distance, has one end aligned with one end of the printed circuit board, and is electrically connected to a ground wiring pattern provided on the one end of the printed circuit board; and a conductive member that is electrically connected to the one end of the conductive chassis plate, and extends from the one end of the conductive chassis plate toward another end thereof.

According to the present invention, one end of the conductive chassis plate does not serve as an open end due to the conductive member electrically connected to one end of the conductive chassis plate. As a result, even if static electricity is discharged to the connector mounted on the other end of the printed circuit board, a voltage fluctuation due to electrostatic discharge on one end of the conductive chassis plate can be suppressed. Accordingly, an influence of the electrostatic discharge on transmission or reception of a signal with respect to the external equipment connected to the connector mounted on one end of the printed circuit board can be reduced with a simple configuration having the conductive member. Moreover, because the conductive member extends from one end of the conductive chassis plate toward the other end thereof, the device can be prevented from being upsized, and the influence of electrostatic discharge can be reduced with the compact structure.

Further features of the present invention will become apparent from the following description of exemplary embodiments with reference to the attached drawings.

BRIEF DESCRIPTION OF THE DRAWINGS

FIG. 4 is a graph illustrating computation results of a voltage of a termination resistor with respect to a length of a conductive member.

DESCRIPTION OF THE EMBODIMENTS

Embodiments for carrying out the present invention are described in detail below with reference to the accompanying drawings.

First Embodiment

Figure 1A:
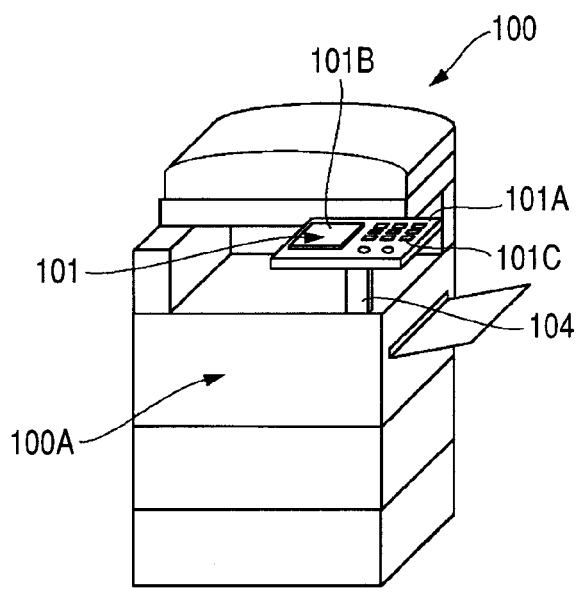
FIGS. 1A and 1B are explanatory diagrams illustrating a schematic configuration of an electronic apparatus according to a first embodiment of the present invention.
Figure 1B:
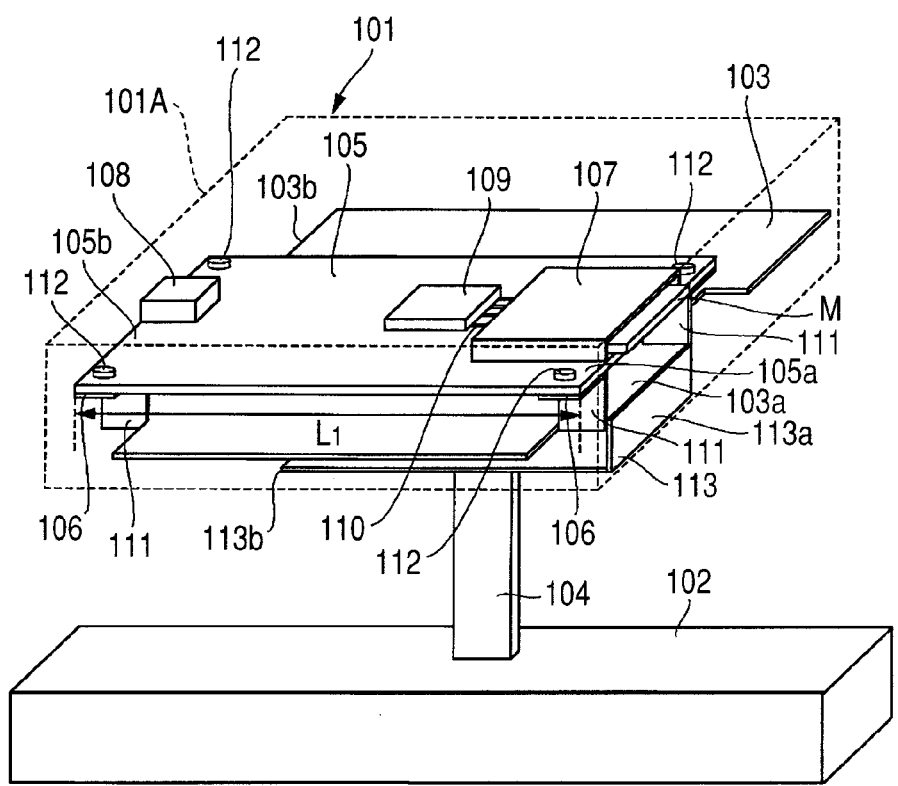

FIGS. 1A and 1B are an explanatory diagram illustrating a schematic configuration of an image forming apparatus as one example of an electronic apparatus according to a first embodiment of the present invention. The image forming apparatus is a copying machine, a printer, a facsimile machine, or a multifunction machine thereof. In the first embodiment, a case where the image forming apparatus is a copying machine is described.

As illustrated in FIG. 1A, a copying machine 100 as the electronic apparatus includes a copying machine main body 100A serving as an electronic apparatus main body, and an operating device 101 provided separately from the copying machine main body 100A, for operating the copying machine main body 100A. The operating device 101 is supported by a conductive support member 104 that projects upward from the copying machine main body 100A. The operating device 101 include a case 101A of a rectangular parallelepiped, and a display operation section 101B, a push button 101C, and the like are provided on an upper surface of the case 101A. As illustrated in FIG. 1B, the operating device 101 includes a printed circuit board 105 housed in the case 101A, and a conductive chassis plate 103 which is housed in the case 101A, and to which ground wiring patterns 106 of the printed circuit board 105 are grounded.

The printed circuit board 105 is a two-layer printed circuit board that is square in a plan view, and a horizontal length of the printed circuit board 105 in a front view is identical with a horizontal length of the interior of the case 101A in the front view. Connectors 107 and 108 are mounted on both ends 105a and 105b of the upper surface of the printed circuit board 105 in the horizontal direction in the front view, respectively. Openings for exposing the connectors 107 and 108 to the external are formed in both side surfaces of the case 101A in the horizontal direction in the front view. The connector 107 mounted on one end 105a of the printed circuit board 105 is a memory media connector to and from which a card type memory media as the external equipment is attachable and detachable. The card type memory media is, for example, a memory card such as an SD memory card or a memory stick. However, the memory media is not limited to those memories. The connector 108 mounted on the other end 105b of the printed circuit board 105 is a memory media connector to and from which a USB memory as the external equipment is attachable and detachable.

Further, an IC 109 for transmitting or receiving a signal indicative of image data with respect to a memory media M mounted in the connector 107 is mounted on the upper surface of the printed circuit board 105. A signal terminal of the connector 107 and a signal terminal of the IC 109 are connected to each other by a wiring pattern 110. Although not shown in the figures, an IC for transmitting or receiving a signal indicative of image data with respect to a memory media mounted in the connector 108 is also mounted on the printed circuit board 105. The ground wiring patterns 106 are provided on a lower surface of the printed circuit board 105. Parts of the ground wiring patterns 106 are disposed at corners (that is, four corners of the printed circuit board 105) of one end 105a and the other end 105b of the printed circuit board 105.

The conductive chassis plate 103 is formed of a conductive plate (for example, copper plate) of a substantially square shape having a horizontal length in the front view identical with a horizontal length $L_1$ of the printed circuit board 105 in the front view, and a depth length in the front view longer than that of the printed circuit board 105. The conductive chassis plate 103 is disposed below the printed circuit board 105 so as to face the printed circuit board 105 at a distance. One end 105a of the printed circuit board 105 in the horizontal direction in the front view is aligned with one end 103a of the conductive chassis plate 103 in the horizontal direction in the front view. Further, the other end 105b of the printed circuit board 105 in the horizontal direction in the front view is aligned with the other end 103b of the conductive chassis plate 103 in the horizontal direction in the front view.

Projecting portions 111 as conductive upright portions are provided on the conductive chassis plate 103 at portions corresponding to the respective corners of both the ends 105a and 105b of the printed circuit board 105, that is, portions corresponding to four corners of the printed circuit board 105. Parts of a single plate constituting the conductive chassis plate 103 are cut and bent so as to be upright so that the four projecting portions 111 are integrated with the conductive chassis plate 103. Among those four projecting portions 111, two projecting portions 111 are formed on one end 103a of the conductive chassis plate 103, and the other two projecting portions 111 are formed on the other end 103b of the conductive chassis plate 103.

Holes (not shown) corresponding to the respective projecting portions 111 are formed in the respective corners of the printed circuit board 105, and screw holes (not shown) are formed in the respective projecting portions 111. The respective corners of the printed circuit board 105 are fixed to the projecting portions 111 with conductive screws 112. As a result, the printed circuit board 105 is supported to the conductive chassis plate 103. The ground wiring patterns 106 at the corners of one end 105a and the other end 105b of the printed circuit board 105 come in contact with the projecting portions 111 so as to be electrically connected to the conductive chassis plate 103, and grounded.

The conductive support member 104 projects upward from a conductive chassis 102 of the copying machine main body 100A, and an upper end of the conductive support member 104 is fixed to substantially the center of a lower surface of the conductive chassis plate 103. With this configuration, the conductive chassis 102 and the conductive chassis plate 103 are electrically connected to each other by means of the conductive support member 104. The conductive chassis plate 103 is grounded to the conductive chassis 102. That is, the conductive chassis plate 103 is grounded to the conductive chassis 102 of the copying machine main body 100A through the conductive support member 104.

Incidentally, in the first embodiment, the operating device 101 includes a conductive member 113 that is housed in the case 101A and electrically connected to one end 103a of the conductive chassis plate 103. The conductive member 113 is formed to extend from one end 103a of the conductive chassis plate 103 toward the other end 103b thereof. The conductive member 113 is formed into a plate that is L-shaped in the front view, and disposed below the conductive chassis plate 103 so as to face the printed circuit board 105 with the conductive chassis plate 103 interposed therebetween. One end 113a of the conductive member 113 is fixed to one end 103a of the conductive chassis plate 103 so as to be electrically connected thereto, and the other end 113b that is an end of the conductive member 113 in the extending direction is out of contact with the conductive chassis plate 103.

In the first embodiment, the conductive chassis plate 103 and the conductive member 113 are integrally formed by bending a single plate. Specifically, the conductive member 113 is formed by bending the single plate downward from a position corresponding to one end of the conductive chassis plate 103. The conductive member 113 is bent in an L-shape in the front view so as not to come in contact with the conductive chassis plate 103, and spaced from the conductive chassis plate 103. Because the other end 113b of the conductive member 113 is out of contact with the conductive chassis plate 103, the other end 113b serves as an open end from the viewpoint of static electricity. The conductive member 113 has the depth dimension set to be shorter than the dimension of the printed circuit board 105 by the length of two projecting portions 111, and set to be shorter than the half dimension of the conductive chassis plate 103. Therefore, the conductive member 113 is out of contact with the conductive support member 104.

Figure 2A:
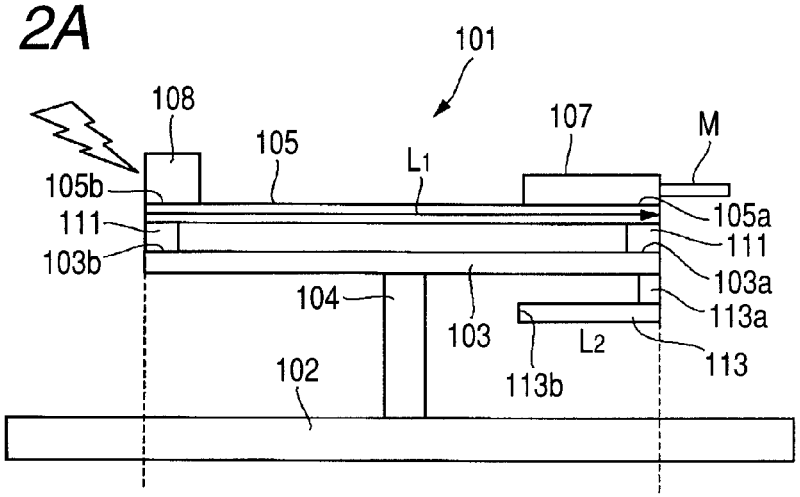
FIGS. 2A, 2B, 2C and 2D are explanatory diagrams illustrating a case where static electricity occurs in connectors of an operating device.

A case where static electricity is discharged to the connector 108 is described below. As illustrated in FIG. 2A, the memory media M is inserted into the connector 107, and the IC 109 illustrated in FIG. 1B transmits or receives a signal with respect to the memory media M. In this case, when static electricity is discharged due to the operation of inserting and removing a memory media (not shown) with respect to the connector 108, the electrostatic discharge pulse that has been applied to the connector 108 is propagated through the printed circuit board 105 in a direction indicated by an arrow illustrated in FIG. 2A, and reaches one end 105a on which the connector 107 is mounted. Specifically, the electrostatic discharge pulse that has been applied to the connector 108 propagates through the ground wiring patterns 106, and reaches one end 105a of the printed circuit board 105. In this example, because one end 105a of the printed circuit board 105 is grounded to the conductive chassis plate 103 by means of the conductive projecting portions 111, the electrostatic discharge pulse flows into the conductive chassis plate 103 without being reflected by one end 105a of the printed circuit board 105.

One end 103a of the conductive chassis plate 103 is electrically connected to the conductive member 113, and hence one end 103a does not serve as an open end from the viewpoint of the electrostatic discharge pulse. For that reason, the electrostatic discharge pulse is not reflected by one end 103a of the conductive chassis plate 103. Accordingly, the electrostatic discharge pulse that has flown into the conductive chassis plate 103 flows into the conductive member 113, and is then reflected by the other end 113b that serves as an open end. A large voltage fluctuation is induced at the other end 113b. Specifically, when it is assumed that a length of the printed circuit board 105 is $L_1$, and an effective dielectric constant of the printed circuit board 105 is $\in_{eff}$, the resonance of the electrostatic discharge pulse having a resonance frequency f with a length of $L_1 \times \sqrt{\in_{eff}}$ as ½ wavelength occurs in the printed circuit board 105. That is, it is assumed that a wavelength in the printed circuit board 105 corresponding to the resonance frequency f is λ. In this case, because a velocity of propagation is $1/\sqrt{\in_{eff}}$, when it is assumed that a wavelength in vacuum corresponding to the resonance frequency f is $\lambda_0$, a relationship of $L_1 = \lambda/2 = \lambda_0/(2 \times \sqrt{\in_{eff}})$ is satisfied. Accordingly, the resonance of the electrostatic discharge pulse having the resonance frequency f which satisfies a relationship of $\lambda_0/2 = L_1 \times \sqrt{\in_{eff}}$ occurs in the printed circuit board 105.

Figure 2B:
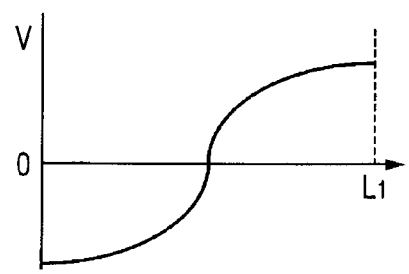
Figure 2C:
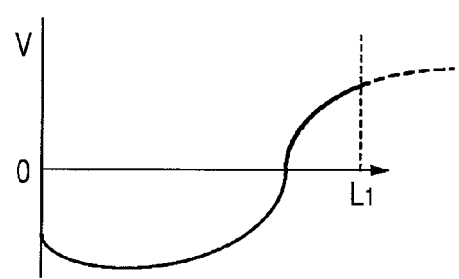

In the case where it is assumed that no conductive member 113 is provided when the electrostatic discharge pulse resonates at the resonance frequency f in the printed circuit board 105, as illustrated in FIG. 2B, a large voltage fluctuation occurs at one end 105a and the other end 105b of the printed circuit board 105. On the contrary, in the first embodiment, because the conductive member 113 is electrically connected to one end 103a of the conductive chassis plate 103, the open end large in voltage fluctuation is displaced to a position of the other end 113b of the conductive member 113, and one end 103a does not serve as an open end. As illustrated in FIG. 2C, because a voltage distribution of the resonance frequency f with a wavelength of $L_1 \times \lambda \in_{eff}$ as ½ wavelength is provided on the basis of the open end of one end 113a of the conductive member 113, the voltage fluctuation is reduced in one end 105a of the printed circuit board 105. As a result, even if static electricity is discharged to the connector 108 mounted on the other end 105b of the printed circuit board 105, the voltage fluctuation caused by electrostatic discharge can be suppressed in one end 103a of the conductive chassis plate 103. Accordingly, with a simple configuration having the conductive member 113, it is possible to reduce an influence of static electricity on transmission or reception of a signal with respect to the memory media M which is connected to the connector 107 mounted on one end 105a of the printed circuit board 105. Moreover, because the conductive member 113 extends from one end 103a of the conductive chassis plate 103 toward the other end 103b thereof, the device can be prevented from increasing in size, and an influence of electrostatic discharge can be reduced with a compact structure. Further, because the conductive chassis plate 103 and the conductive member 113 are integrally formed by bending a single plate, there is no work of connecting the conductive chassis plate 103 and the conductive member 113, which facilitates manufacturing.

In the case of another resonance frequency f' in which a distance between the other end 105b of the printed circuit board 105 and the other end 113b of the conductive member 113 is ½ wavelength, the respective ends 105b and 113b serve as open ends. Then, it is conceivable that the voltage fluctuation is large at the respective ends 105b and 113b. However, the electrostatic discharge pulse of another resonance frequency f' is very smaller in voltage level than the electrostatic discharge pulse of the above-mentioned resonance frequency f, and the open ends are displaced from one end 105a of the printed circuit board 105. Therefore, there hardly arises a problem.

Incidentally, a length $L_2$ of the conductive member 113 can be arbitrarily set. However, the length $L_2$ is preferably set so that the voltage fluctuation becomes smallest (a node of the voltage fluctuation) at the position of one end 105a of the printed circuit board 105. In this example, the length $L_2$ of the conductive member 113 is vertical and horizontal lengths in the front view because the conductive member 113 is L-shaped.

Figure 2D:
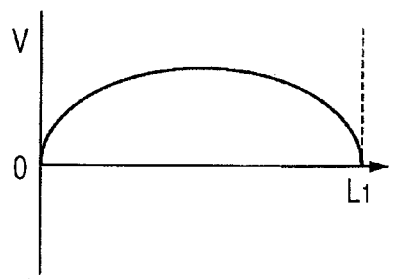

In the conductive member 113, the node of the voltage fluctuation is at a position of the odd times of $\lambda_0/4$ from the other end 113b serving as an open end. Accordingly, when it is assumed that the length $L_2$ of the conductive member 113 is $(2 \times n+1) \times \lambda_0/4$ (n is an integer of 0 or larger), because $\lambda_0 = 2 \times L_1 \times \lambda \in_{\it eff}$ is met, $L_2 = (2 \times n+1) \times \lambda_0/4 = (2 \times n+1) \times L_1 \times \lambda \in_{\it eff}/2$ is satisfied. When the length $L_2$ of the conductive member 113 is set so as to satisfy this formula, one end 103a of the conductive chassis plate 103, that is, one end 105a of the printed circuit board 105 becomes the node of the voltage fluctuation as illustrated in FIG. 2D, and the voltage fluctuation becomes smallest. Accordingly, an influence of electrostatic discharge on the memory media M becomes smallest. Among the cases where the voltage fluctuation at one end 105a of the printed circuit board 105 is smallest, in the case of n=0, the length $L_2$ of the conductive member 113 becomes smallest, and the device is downsized.

Figure 3A:
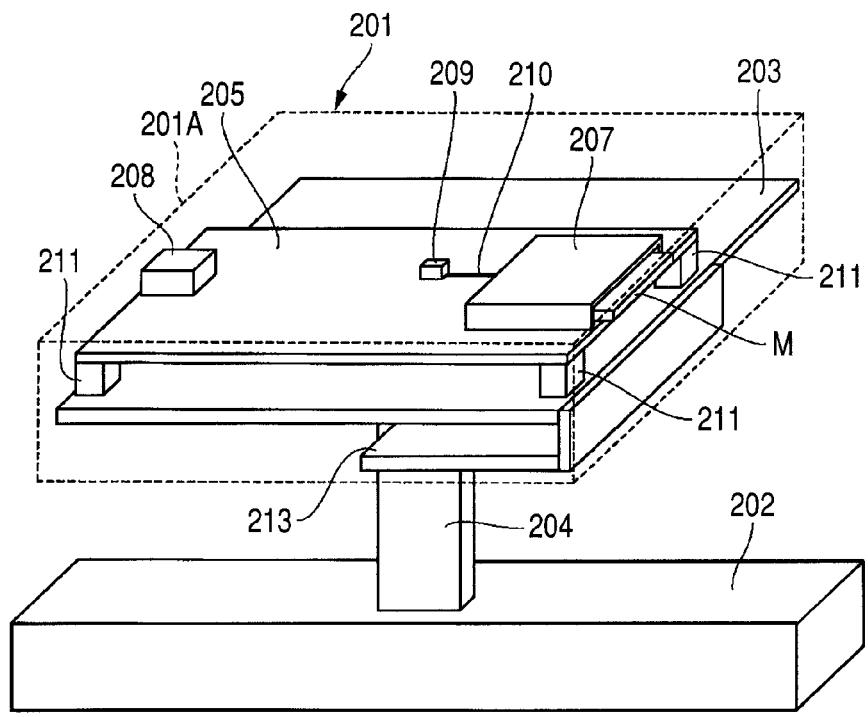
FIGS. 3A and 3B are a perspective view illustrating a simulation model of the operating device, and a graph illustrating computation results, respectively.

Next, for confirmation of the above-mentioned action, the results of conducting electromagnetic field simulation computation in a model of an operating device 201 illustrated in FIG. 3A are described. For simulation, the configurations of the respective members of the operating device 201 are simplified more than those of the operating device 101 illustrated in FIG. 1B. However, substantially the same results of those of the operating device 101 are obtained with respect to electrostatic discharge pulse. In the operating device 201 illustrated in FIG. 3A, a printed circuit board 205 that is rectangular in the plan view, and a conductive chassis plate 203 that is identical with the printed circuit board 205 in the horizontal length of the front view and longer than the printed circuit board 205 in the depth length are housed in a case 201A. Respective connectors 207 and 208 are provided on both ends of the printed circuit board 205, and a termination resistor 209 corresponding to the internal resistor of an IC is connected to the connector 207 by means of a wire 210. Conductive projecting portions 211 are provided at four corners of the printed circuit board 205. Further, an L-shaped conductive member 213 is connected to one end of the conductive chassis plate 203. The conductive chassis plate 203 and a conductive chassis 202 are connected to each other by the aid of a conductive support member 204.

Figure 3B:
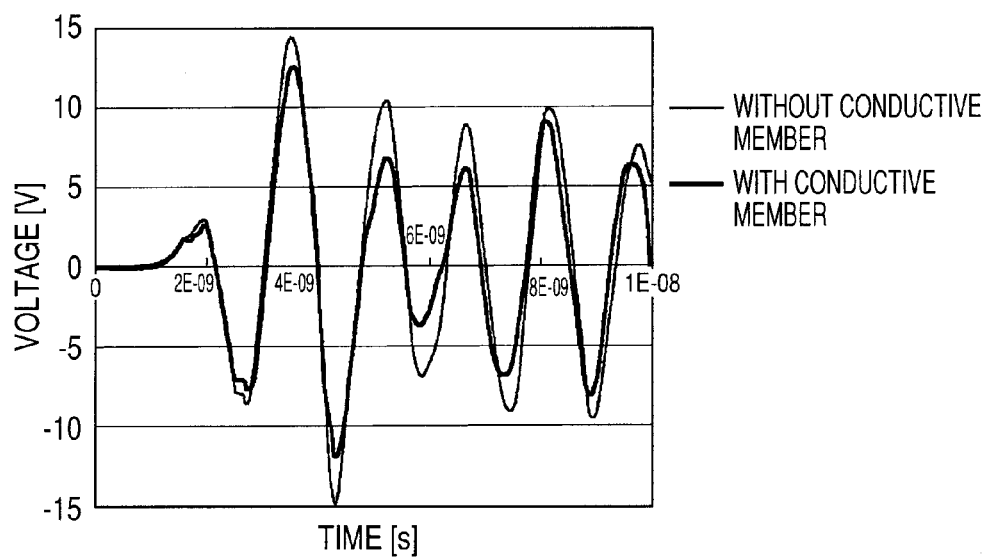

It is assumed that the conductive chassis plate 203 is 15 cm wide (horizontal direction) and 12 cm deep (depth direction), and the printed circuit board 205 is 15 cm wide and 7 cm deep. Accordingly, the length $L_1$ of the printed circuit board 205 is 15 cm. Further, the conductive projecting portions 211 are 0.5 cm high. The termination resistor 209 is 1 kΩ. The printed circuit board 205 is formed of a two-layer substrate, and the substrate material quality is FR-4 (dielectric constant $\in r = 4.8$). In this case, the effective dielectric constant $\in_{\it eff}$ of the printed circuit board 205 is about 2.8. As described above, the optimum length of the conductive member 213 is obtained by the formula $L_2 = (2 \times n+1) \times L_1 \times \lambda \in_{\it eff}/2$. Therefore, in the case of n=0 where the size of the conductive member 213 is smallest, when the respective values are assigned to a right side of the formula, $L_2 \approx 12.5$ cm is satisfied. Thus, the length $L_2$ of the conductive member 213 is obtained. Accordingly, the L-shaped conductive member 213 is 12 cm wide, 0.5 cm high, and 8 cm deep. In this example, FIG. 3B illustrates the voltage computation results of the termination resistor 209, when an initial charge value of the electrostatic discharge pulse is set to 5 KV and the electrostatic discharge pulse is applied to the connector 208. The axis of abscissa is a time, and the axis of ordinate is a voltage value. For comparison, the computation results when the conductive member 213 is not connected to one end of the conductive chassis plate 203 are also illustrated in FIG. 3B.

It is understood from the computation results illustrated in FIG. 3B that the induced voltage by the electrostatic discharge pulse when the L-shaped conductive member 213 is connected to one end of the conductive chassis plate 203 can be suppressed as compared with that when not connected. Accordingly, it is understood that the amplitude of the voltage of the electrostatic discharge pulse is lower and the voltage is lower over the entire pulse duration when the conductive member 213 is connected in the connector 207 of the printed circuit board 205. As a result, the malfunction in transmitting or receiving the signal can be suppressed even if the electrostatic discharge pulse is superimposed on the signal.

Further, in order to confirm the induced voltage suppressing effect due to the electrostatic discharge pulse depending on the length of the conductive member 213, the results of calculating the effective value of the voltage while changing the length of the conductive member 213 are illustrated in FIG. 4. FIG. 4 is a graph for comparing the voltage values at the resonance frequency 600 MHz when the long side (horizontal direction in the front view) of the printed circuit board 205 is ½ wavelength. As illustrated in FIG. 4, the voltage suppressing effect is highest when the length of the conductive member 213 is 12.5 cm which is a length of $\lambda_0/4$ at the resonance frequency 600 MHz, which obtains the reduction effect of about 30% as compared with that when the conductive member 213 is not connected to the conductive chassis plate 203.

The voltage suppressing effect is higher when the length of the conductive member 213 is 13.75 cm and 11.25 cm which are ±10% of the length of $\lambda_{0/4}$, which obtains the reduction effect of about 20% as compared with that when the conductive member 213 is not connected to the conductive chassis plate 203. However, the voltage suppressing effect is reduced to lower than 10% when the length of the conductive member 213 is 10 cm and 15 cm which are ±20% of the length of $\lambda_{0/4}$, as compared with that when the conductive member 213 is not connected to the conductive chassis plate 203. Accordingly, the length $L_2$ of the conductive member 213 is set to be in a range of +10% of $(2 \times n+1) \times \lambda_0/4$, to thereby obtain the sufficient reduction effect of the voltage fluctuation on one end of the printed circuit board 205.

Second Embodiment

Figure 5:
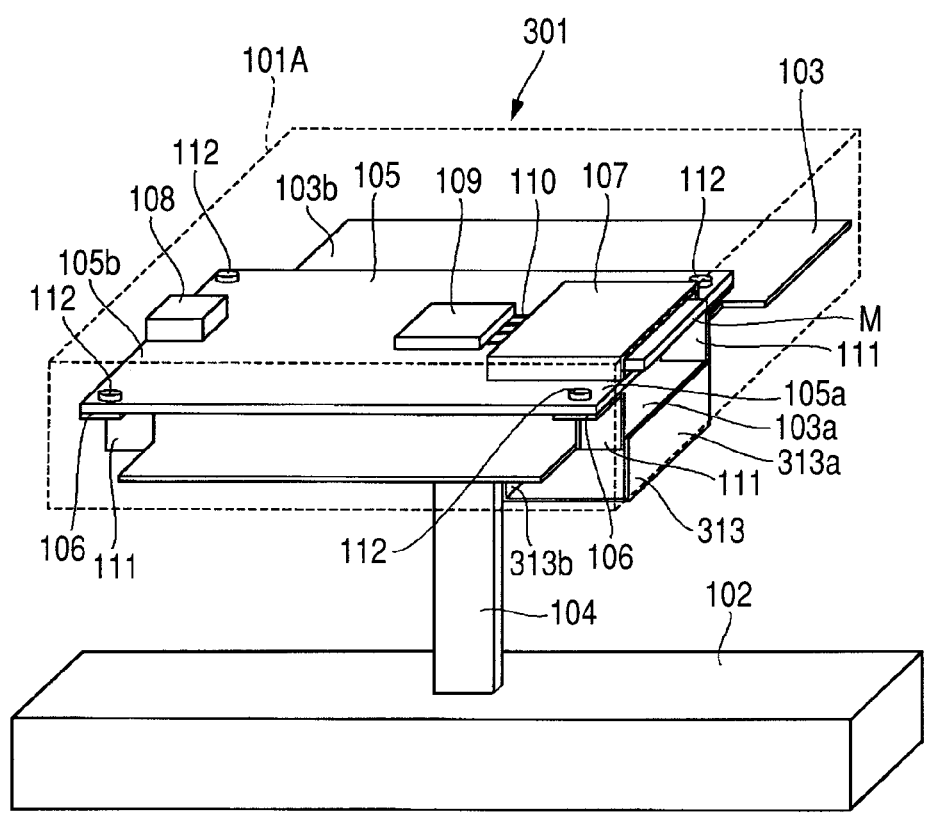
FIG. 5 is a perspective view illustrating a schematic configuration of an electronic apparatus according to a second embodiment of the present invention.

Next, a copying machine as an electronic apparatus according to a second embodiment is described below. In the second embodiment, the same configurations as those in the first embodiment are denoted by identical symbols and their description is omitted. FIG. 5 is a perspective view of an operating device 301 of the copying machine according to the second embodiment of the present invention. In the operating device 301 according to the second embodiment, the shape of a conductive member 313 is different from the shape of the conductive member 113 of the first embodiment. That is, in the first embodiment, one end 113a of the conductive member 113 is electrically connected to one end 103a of the conductive chassis plate 103 while the other end 113b is opened.

On the contrary, in the second embodiment, one end 313a of the conductive member 313 is electrically connected to one end 103a of the conductive chassis plate 103. The conductive member 313 extends from one end 103a of the conductive chassis plate 103 toward the other end 103b. The other end 313b that is an end of the conductive member 313 in the extending direction is bent upward, and electrically connected to a lower surface of the conductive chassis plate 103 other than the ends 103a and 103b. That is, the conductive member 313 is formed by bending a flat plate into a U-shape. The conductive chassis plate 103 and the conductive member 313 are formed by bending a single plate which is integrally continuous at one end 103a and one end 313a. The other end 313b of the conductive member 313 may be fixed to the conductive chassis plate 103 by brazing or soldering, or may be fixedly connected to the conductive chassis plate 103 with a conductive screw (not shown). The conductive member 313 is set to be shorter in the depth dimension than the dimension of the printed circuit board 105 by the length of two projecting portions 111.

Figure 6A:
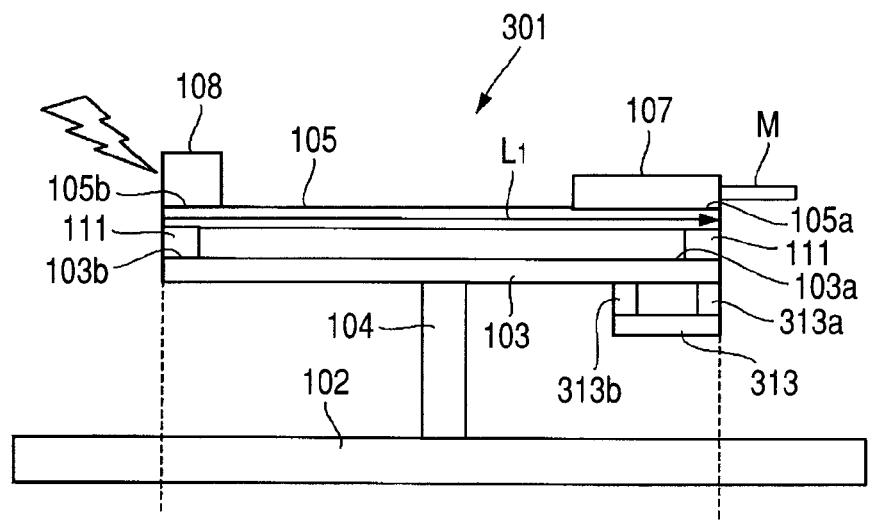
FIGS. 6A and 6B are explanatory diagrams illustrating a case where static electricity occurs in connectors of an operating device.

A case where static electricity is discharged to the connector 108 is described below. As illustrated in FIG. 6A, the memory media M is inserted into the connector 107, and the IC 109 illustrated in FIG. 5 transmits or receives a signal with respect to the memory media M. In this case, when static electricity is discharged by a user with respect to the connector 108, the electrostatic discharge pulse that has been applied to the connector 108 is propagated through the printed circuit board 105 in a direction indicated by an arrow illustrated in FIG. 6A, and reaches one end 105a on which the connector 107 is mounted. In this example, because one end 105a of the printed circuit board 105 is grounded to the conductive chassis plate 103 by means of the conductive projecting portions 111, the electrostatic discharge pulse flows into the conductive chassis plate 103 without being reflected by one end 105a of the printed circuit board 105.

Figure 6B:
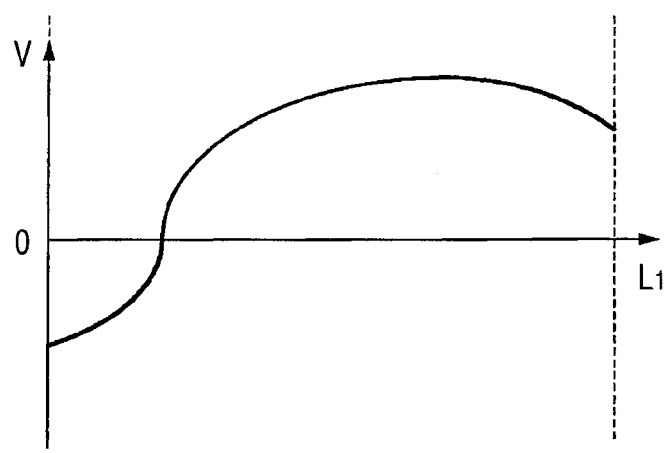

One end 103a of the conductive chassis plate 103 is electrically connected to the conductive member 113, and hence one end 103a does not serve as an open end from the viewpoint of the electrostatic discharge pulse. For that reason, the electrostatic discharge pulse is not reflected by one end 103a of the conductive chassis plate 103. Accordingly, the electrostatic discharge pulse that has flown in the conductive chassis plate 103 flows in the conductive member 313. However, because the other end 313b of the conductive member 313 is connected to the conductive chassis plate 103, the other end 313b serves as a short-circuit end from the viewpoint of the electrostatic discharge pulse. For that reason, as illustrated in FIG. 6B, because a loop of the voltage fluctuation is not formed at one end 105a of the printed circuit board 105, the voltage fluctuation at one end 105a is reduced, and an influence of static electricity on the memory media M is reduced. The length of the conductive member 313 is adjusted to enable the voltage fluctuation at one end 105a of the printed circuit board 105 to approach the node.

As described above, according to the second embodiment, even if static electricity is discharged to the connector 108 mounted on the other end 105b of the printed circuit board 105, the voltage fluctuation caused by the electrostatic discharge can be suppressed on one end 103a of the conductive chassis plate 103. Accordingly, with a simple configuration having the conductive member 313, it is possible to reduce an influence of static electricity on transmission or reception of a signal with respect to the memory media M which is connected to the connector 107 mounted on one end 105a of the printed circuit board 105. Moreover, because the conductive member 313 extends from one end 103a of the conductive chassis plate 103 toward the other end 103b thereof, the device can be prevented from increasing in size, and an influence of electrostatic discharge can be reduced with a compact structure. Further, because the conductive chassis plate 103 and the conductive member 313 are integrally formed by bending a single plate, there is no work of connecting the conductive chassis plate 103 and the conductive member 313, which facilitates manufacturing.

Figure 7A:
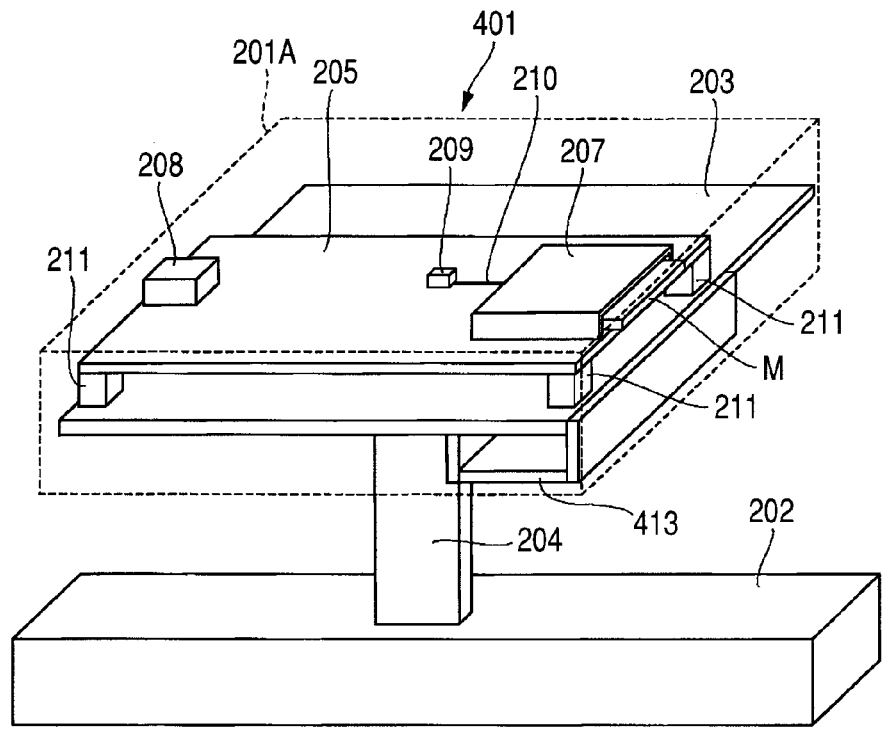
FIGS. 7A and 7B are a perspective view illustrating a simulation model of the operating device, and a graph illustrating computation results, respectively.
Figure 7B:
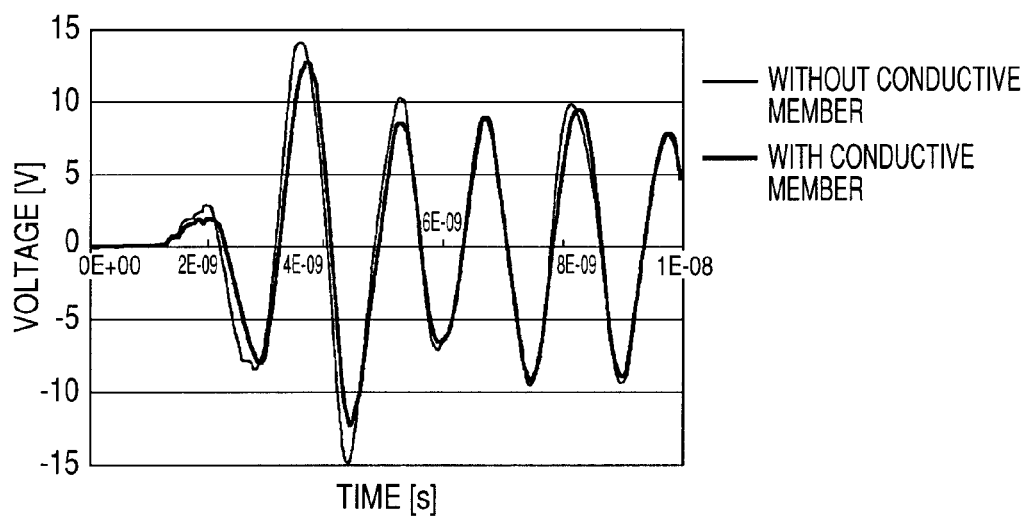

Next, for confirmation of the above-mentioned action, the results of conducting electromagnetic field simulation computation in a model of an operating device 401 illustrated in FIG. 7A are described. For simulation, the configurations of the respective members of the operating device 401 are simplified more than those of the operating device 301 illustrated in FIG. 5. However, substantially the same results of those of the operating device 301 are obtained with respect to electrostatic discharge pulse. The same parts as those of FIG. 3A in the first embodiment are denoted by identical symbols, and their description is omitted. The operating device 401 illustrated in FIG. 7A includes a U-shaped conductive member 413 connected to the conductive chassis plate 203. One end of the conductive member 413 is electrically connected to one end of the conductive chassis plate 203, and the other end of the conductive member 413 is electrically connected to the lower surface of the conductive chassis plate 203. It is assumed that the conductive chassis plate 203 is 15 cm wide (horizontal direction) and 12 cm deep (depth direction), and the printed circuit board 205 is 15 cm wide and 7 cm deep. Accordingly, the length $L_1$ of the printed circuit board 205 is 15 cm. Further, the conductive projecting portions 211 are 0.5 cm high. The termination resistor 209 is 1 kΩ. Further, the U-shaped conductive member 413 is 1 cm wide and 8 cm deep, a height of both ends is 0.5 cm. In this example, FIG. 7B illustrates the voltage computation results of the termination resistor 209, when an initial charge value of the electrostatic discharge pulse is set to 5 KV and the electrostatic discharge pulse is applied to the connector 208. The axis of abscissa is a time, and the axis of ordinate is a voltage value. For comparison, the computation results when the conductive member 413 is not connected to one end of the conductive chassis plate 203 are also illustrated in FIG. 7B.

It is understood from the computation results illustrated in FIG. 7B that the induced voltage by the electrostatic discharge pulse when the U-shaped conductive member 413 is connected to the conductive chassis plate 203 can be suppressed as compared with that when not connected. Accordingly, it is understood that the amplitude of the voltage of the electrostatic discharge pulse is lower and the voltage is lower over the entire pulse duration when the conductive member 413 is connected in the connector 207 of the printed circuit board 205. As a result, the malfunction in transmitting or receiving the signal can be suppressed even if the electrostatic discharge pulse is superimposed on the signal.

Third Embodiment

Figure 8:
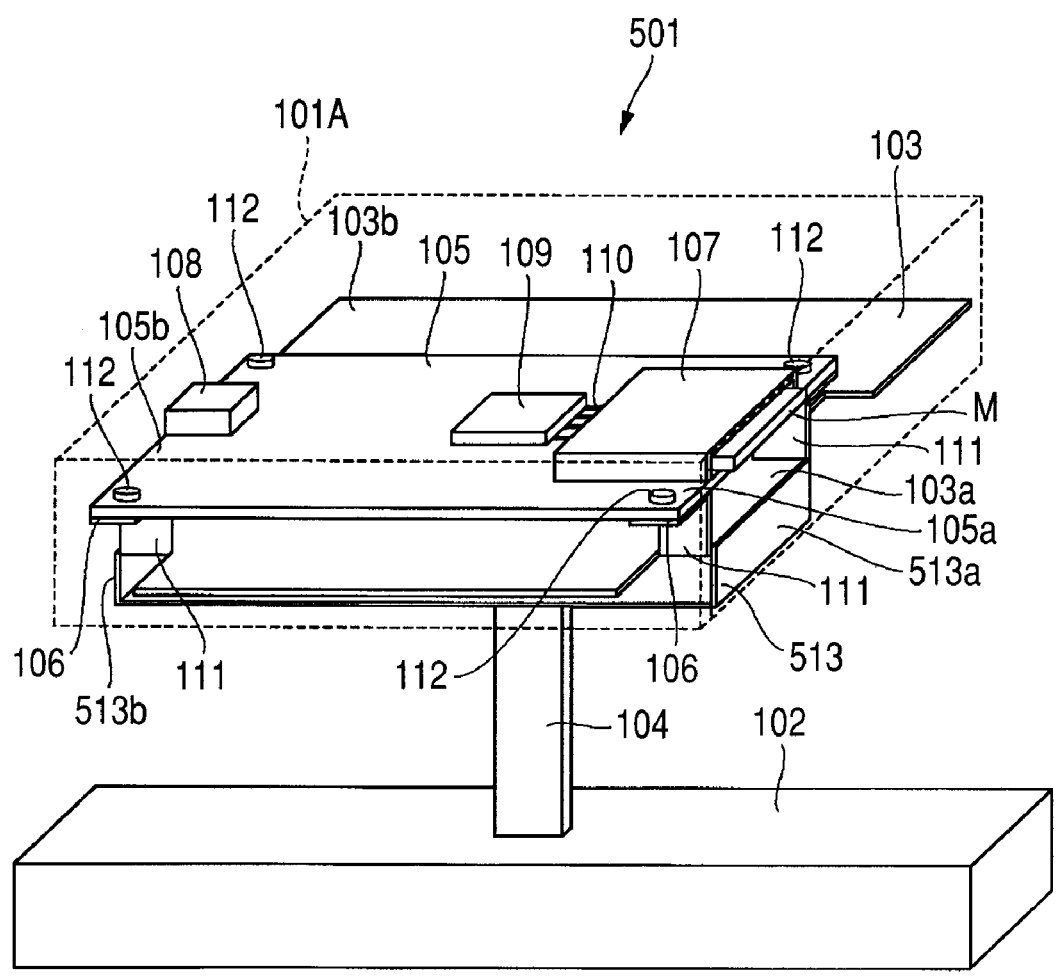
FIG. 8 is a perspective view illustrating a schematic configuration of an electronic apparatus according to a third embodiment of the present invention.

Next, a copying machine as an electronic apparatus according to a third embodiment is described below. In the third embodiment, the same configurations as those in the first and second embodiments are denoted by identical symbols and their description is omitted. FIG. 8 is a perspective view of an operating device 501 of the copying machine according to the third embodiment of the present invention. In the operating device 501 according to the third embodiment, the shape of a conductive member 513 is different from the shape of the conductive member 313 of the second embodiment. That is, in the second embodiment, one end 313a of the conductive member 313 is connected to one end 103a of the conductive chassis plate 103 while the other end 113b is connected to the lower surface of the conductive chassis plate 103 other than the ends 103a and 103b.

On the contrary, in the third embodiment, one end 513a of the conductive member 513 is electrically connected to one end 103a of the conductive chassis plate 103. The conductive member 513 extends from one end 103a of the conductive chassis plate 103 toward the other end 103b. The other end 513b that is an end of the conductive member 513 in the extending direction is bent upward, and electrically connected to the other end 103b of the conductive chassis plate 103. That is, the conductive member 513 is formed by bending a plate into a U-shape. The conductive chassis plate 103 and the conductive member 513 are formed by bending a single plate which is integrally continuous at one end 103a and one end 513a. The other end 513b of the conductive member 513 may be fixed to the other end 103b of the conductive chassis plate 103 by brazing or soldering, or may be fixedly connected to the conductive chassis plate 103 with a conductive screw (not shown). The conductive member 513 is set to be shorter in the depth dimension than the dimension of the printed circuit board 105 by the length of two projecting portions 111.

According to the third embodiment, the same effects as those in the second embodiment are obtained, and other effects are obtained. That is, because the horizontal length of the conductive member 513 in the front view is identical with the length of the conductive chassis plate 103, the conductive member 513 functions as a chassis plate. Accordingly, another printed circuit board different from the printed circuit board 105 can be fixedly supported to the conductive member 513. Further, the conductive chassis plate 103 and the conductive member 513 enable the strength of the operating device 501 to be enhanced with a simple structure.

In the third embodiment, a case where the memory media M is inserted into the connector 107 and the static electricity is discharged to the connector 108 has been described. Alternatively, the voltage fluctuation can be suppressed even in a case where a memory media (not shown) is inserted into the connector 108 and the static electricity is discharged to the connector 107. That is, the electrostatic discharge pulse that has been applied to one end 105a of the printed circuit board 105 through the connector 107 is guided to the conductive member 513 through the other end 103b of the conductive chassis plate 103 after having propagated to the other end 105b of the printed circuit board 105. Accordingly, the voltage fluctuation caused by the electrostatic discharge is reduced in the connector 108, and it is possible to reduce an influence of static electricity on transmission or reception of a signal with respect to the memory media (not shown) which is inserted into the connector 108.

Figure 9A:
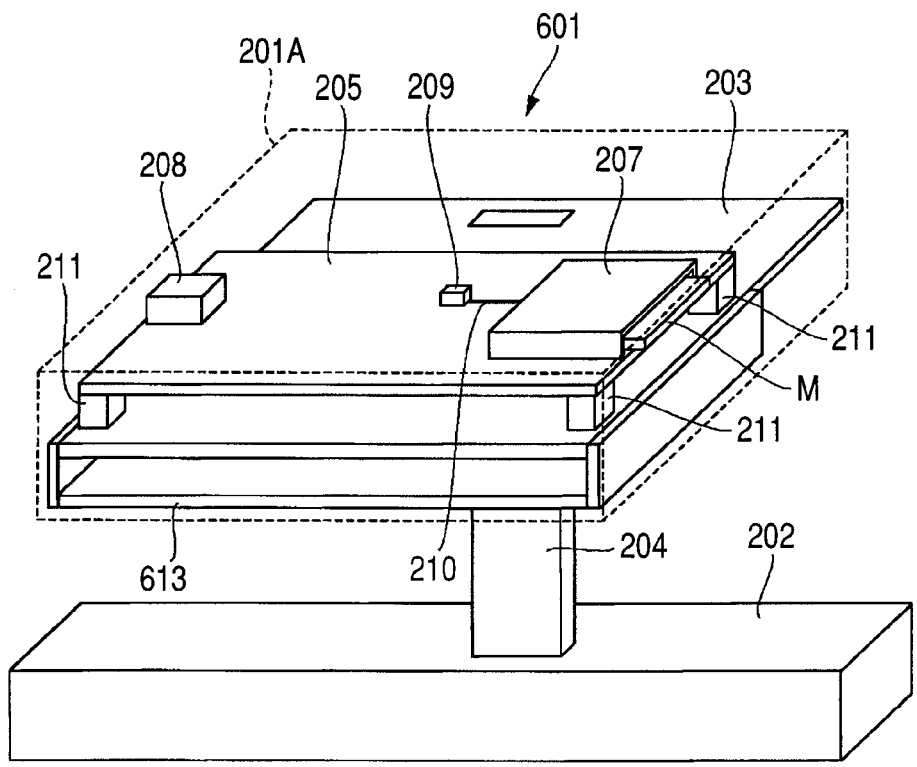
FIGS. 9A and 9B are a perspective view illustrating a simulation model of an operating device, and a graph illustrating computation results, respectively.
Figure 9B:
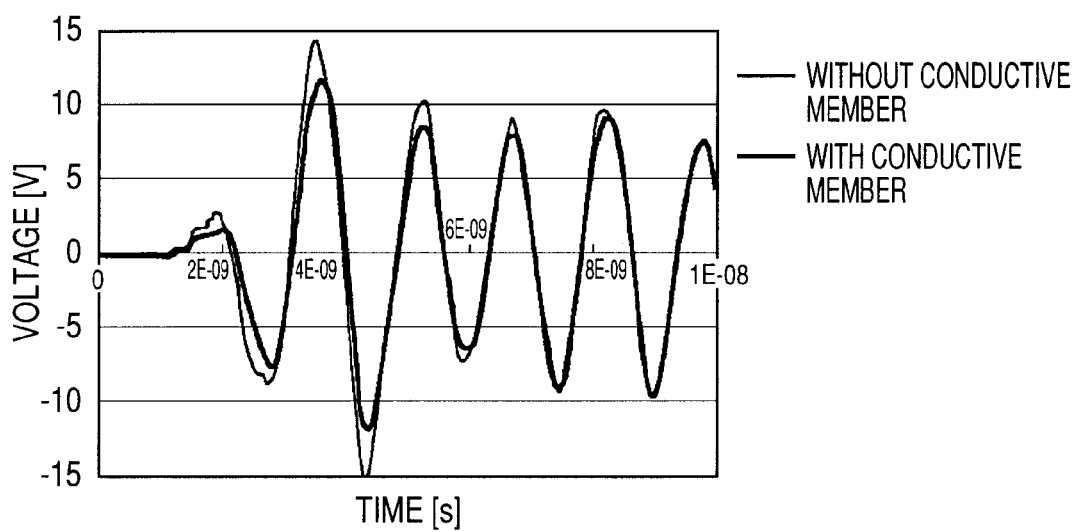

Next, for confirmation of the above-mentioned action, the results of conducting electromagnetic field simulation computation in a model of an operating device 601 illustrated in FIG. 9A are described. For simulation, the configurations of the respective members of the operating device 601 are simplified more than those of the operating device 501 illustrated in FIG. 8. However, substantially the same results of those of the operating device 601 are obtained with respect to electrostatic discharge pulse. The same parts as those of FIG. 3A in the first embodiment are denoted by identical symbols, and their description is omitted. The operating device 601 illustrated in FIG. 9A includes a U-shaped conductive member 613 connected to the conductive chassis plate 203. One end of the conductive member 613 is electrically connected to one end of the conductive chassis plate 203, and the other end of the conductive member 613 is electrically connected to the other end of the conductive chassis plate 203. It is assumed that the conductive chassis plate 203 is 15 cm wide (horizontal direction) and 12 cm deep (depth direction), and the printed circuit board 205 is 15 cm wide and 7 cm deep. Accordingly, the length $L_1$ of the printed circuit board 205 is 15 cm. Further, the conductive projecting portions 211 are 0.5 cm high. The termination resistor 209 is 1 kΩ. Further, the U-shaped conductive member 613 is 15 cm wide and 8 cm deep, and a height of both ends is 0.5 cm. In this example, FIG. 9B illustrates the voltage computation results of the termination resistor 209, when an initial charge value of the electrostatic discharge pulse is set to 5 KV and the electrostatic discharge pulse is applied to the connector 208. The axis of abscissa is a time, and the axis of ordinate is a voltage value. For comparison, the computation results when the conductive member 613 is not connected to one end of the conductive chassis plate 203 are also illustrated in FIG. 9B.

It is understood from the computation results illustrated in FIG. 9B that the induced voltage by the electrostatic discharge pulse when the U-shaped conductive member 613 is connected to the conductive chassis plate 203 can be suppressed as compared with that when not connected. Accordingly, it is understood that the amplitude of the voltage of the electrostatic discharge pulse is lower and the voltage is lower over the entire pulse duration when the conductive member 613 is connected in the connector 207 of the printed circuit board 205. As a result, the malfunction in transmitting or receiving the signal can be suppressed even if the electrostatic discharge pulse is superimposed on the signal.

Fourth Embodiment

Figure 10:
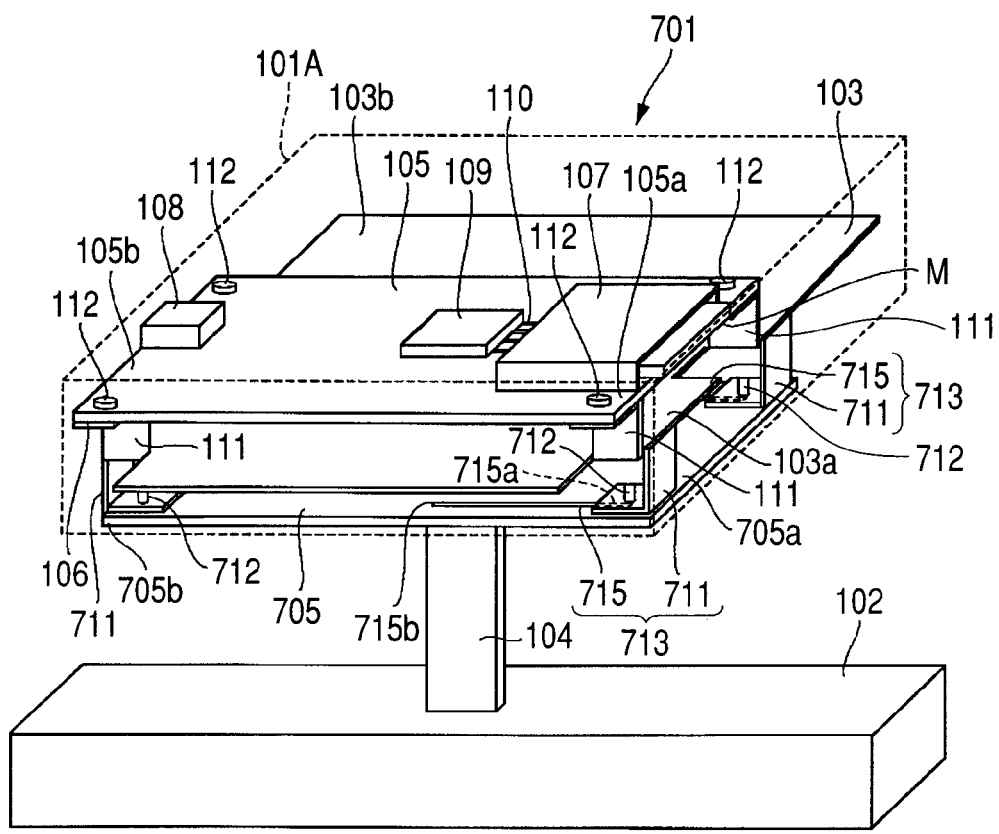
FIG. 10 is a perspective view illustrating a schematic configuration of an electronic apparatus according to a fourth embodiment of the present invention.

Next, a copying machine as an electronic apparatus according to a fourth embodiment is described. In the fourth embodiment, the same configurations as those in the first embodiment are denoted by identical symbols, and their description is omitted. FIG. 10 is a perspective view of an operating device 701 of the copying machine according to the fourth embodiment of the present invention. In the fourth embodiment, the operating device 701 includes another printed circuit board 705 (hereinafter referred to as "second printed circuit board 705") different from the printed circuit board 105 (hereinafter referred to as "first printed circuit board 105"). The second printed circuit board 705 is disposed blow the conductive chassis plate 103 so as to face the first printed circuit board 105 with the conductive chassis plate 103 interposed therebetween. The second printed circuit board 705 is formed to have the same size as that of the first printed circuit board 105, and both ends of the second printed circuit board 705 are aligned with both ends of the first printed circuit board 105 in the front view.

The conductive projecting portions 111 extending upward are provided on parts of the conductive chassis plate 103 corresponding to the corners (four corners) of both the ends 105a and 105b of the first printed circuit board 105. Similarly, conductive projecting portions 711 extending downward are provided on parts of the conductive chassis plate 103 corresponding to corners (four corners) of both ends 705a and 705b of the second printed circuit board 705. Those four projecting portions 711 are integrated with the conductive chassis plate 103 by cutting and bending downward parts of a signal plate constituting the conductive chassis plate 103. Among those four projecting portions 711, two projecting portions 711 are formed on one end 103a of the conductive chassis plate 103, and the other two projecting portions 711 are formed on the other end 103b of the conductive chassis plate 103.

Holes (not shown) corresponding to the respective projecting portions 711 are formed in the respective corners of the second printed circuit board 705, and a screw hole (not shown) is formed in each projecting portion 711. The respective corners of the second printed circuit board 705 are fixed to the projecting portions 711 with conductive screws 712. With this configuration, the second printed circuit board 705 is supported to the conductive chassis plate 103.

In the fourth embodiment, there are provided respective belt-like wiring patterns 715 that are provided on the upper surface of the second printed circuit board 705 and extend from two corners of one end 705a of the second printed circuit board 705 toward the other end 705b. The wiring patterns 715 come in contact with the projecting portions 711, and are electrically connected to the projecting portions 711 when the second printed circuit board 705 is fixed to the projecting portions 711 with the conductive screws 712. Accordingly, in the fourth embodiment, a conductive member 713 is configured by the projecting portions 711 and the wiring pattern 715. Specifically, each of the wiring patterns 715 is a land in which one end 715a is disposed around a hole (not shown) which is formed at the corner of the second printed circuit board 705, and the land comes in contact with the projecting portion 711, and is fixed to the projecting portion 711 with the conductive screw 712 so as to be electrically connected to the projecting portion 711. As a result, the wiring pattern 715 of the conductive member 713 is electrically connected to one end 103a of the conductive chassis plate 103 through the projecting portion 711. Because each wiring pattern 715 extends from the corner of the second printed circuit board 705, the wiring pattern 715 does not interrupt another wiring pattern formed on the second printed circuit board 705.

Incidentally, the other end 715b that is an end of the wiring pattern 715 of the conductive member 713 in the extending direction is an open end, the electrostatic discharge pulse is reflected at the open end, and the voltage fluctuation becomes largest (loop). Accordingly, as in the first embodiment, in order to make the voltage fluctuation smallest (node) at one end 105a of the first printed circuit board 105, it is most suitable that the length of the conductive member 713 is set to (2×n+1)/4 wavelength at the resonance frequency f of the electrostatic discharge pulse which resonates in the first printed circuit board 105. The length of the conductive member 713 is set to be in a range of ±10% of (2×n+1)/4 wavelength, to thereby obtain the sufficient reduction effect of the voltage fluctuation on one end 105a of the first printed circuit board 105. Here, n is an integer of 0 or larger.

Because the wiring patterns 715 of the conductive members 713 are disposed on the second printed circuit board 705, the effective dielectric constant of the second printed circuit board 705 affects the computation of the length. It is assumed that the length of the first printed circuit board 105 is $L_1$, the effective dielectric constant of the first printed circuit board 105 is $\in_{\mathit{eff1}}$, the effective dielectric constant of the second printed circuit board 705 is $\in_{\mathit{eff2}}$ and the height of the projecting portions 711 of each of the conductive members 713 is R. In this case, it is assumed that the length of the wiring patterns 715 of the conductive members 713 is $L_{21}$. In order to make the voltage fluctuation smallest (node) at one end 105a of the printed circuit board 105, the length $L_{21}$ of the wiring patterns 715 may be obtained by subtracting the length R of the projecting portions 711 from $(2\times n+1)\times L_1 \times \lambda \in_{\mathit{eff1}}/2$, and multiplying the subtracted value by $1/\sqrt{\in_{\mathit{eff2}}}$. $1/\sqrt{\in_{\mathit{eff2}}}$ is a velocity of propagation in the wiring patterns 715 on the second printed circuit board 705. That is, the length of the wiring patterns 715 can be obtained by $L_{21}=\{(2\times n+1)\times L_1 \times \sqrt{\in_{\mathit{eff1}}}/2-R\}/\sqrt{\in_{\mathit{eff2}}}$ (n is an integer of 0 or larger). When the length $L_{21}$ of the wiring patterns 715 is set so as to satisfy this formula, one end 103a of the conductive chassis plate 103, that is, one end 105a of the first printed circuit board 105 becomes the node of the voltage fluctuation, and the voltage fluctuation becomes smallest. Accordingly, an influence of electrostatic discharge on the memory media M becomes smallest. Among the cases where the voltage fluctuation at one end 105a of the printed circuit board 105 is smallest, in the case of n=0, the length $L_{21}$ of the wiring patterns 715 is smallest, and the device is downsized. As the wiring patterns 715 on the second printed circuit board 705, for adjustment of the characteristic of the wiring patterns 715, a component mounted pattern may be disposed so that a passive component such as a resistor, a capacitor, or an inductor can be disposed.

Figure 11A:
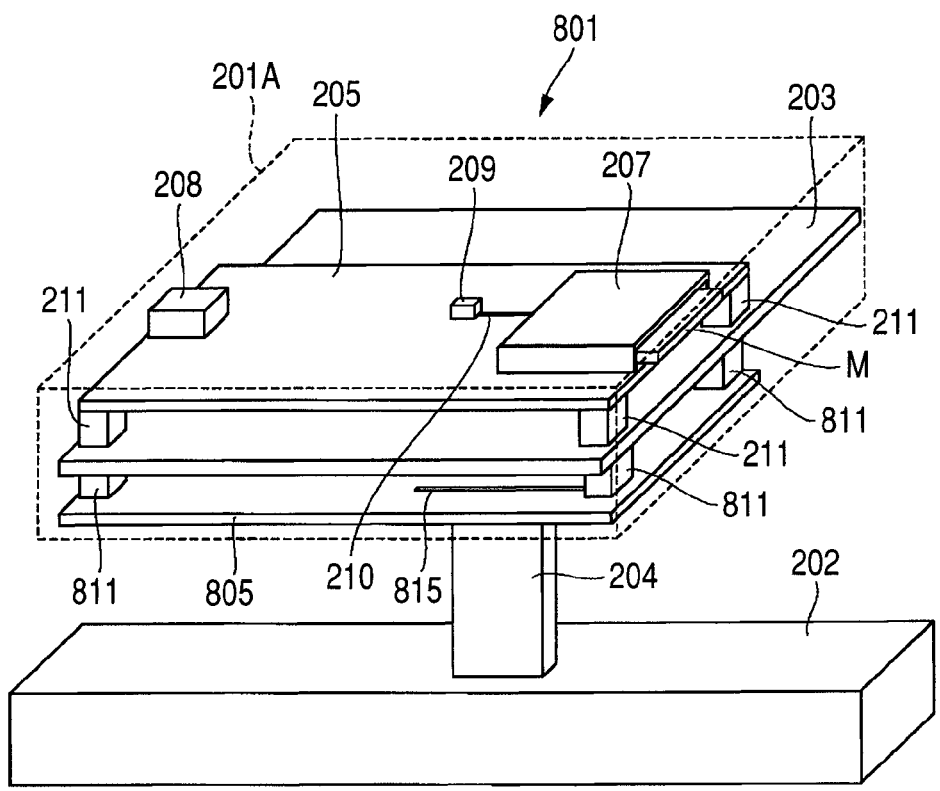
FIGS. 11A and 11B are a perspective view illustrating a simulation model of an operating device, and a graph illustrating computation results, respectively.

Next, for confirmation of the above-mentioned action, the results of conducting electromagnetic field simulation computation in a model of an operating device 801 illustrated in FIG. 11A are described. For simulation, the configurations of the respective members of the operating device 801 are simplified more than those of the operating device 701 illustrated in FIG. 10. However, substantially the same results of those of the operating device 701 are obtained with respect to electrostatic discharge pulse. The same parts as those of FIG. 3A in the first embodiment are denoted by identical symbols, and their description is omitted. The operating device 801 illustrated in FIG. 11A includes another second printed circuit board 805 different from the first printed circuit board 205. The second printed circuit board 805 is disposed below the conductive chassis plate 203 so as to face the first printed circuit board 205 with the conductive chassis plate 203 interposed therebetween. The second printed circuit board 805 is formed to have the same size as that of the first printed circuit board 205, and both ends of the second printed circuit board 805 are aligned with both ends of the first printed circuit board 205 in the front view. At portions of the conductive chassis plate 203 corresponding to corners (four corners) at both ends of the second printed circuit board 805, there are provided respective conductive projecting portions 811 that extend downward. Respective wiring patterns 815 are provided on the upper surface of the second printed circuit board 805 and extend from two corners of one end of the second printed circuit board 805 toward the other end. On the second printed circuit board 805, only the wiring patterns 815 are disposed. One end of each wiring pattern 815 is electrically connected to the projecting portion 811, and the other end thereof is opened.

Figure 11B:
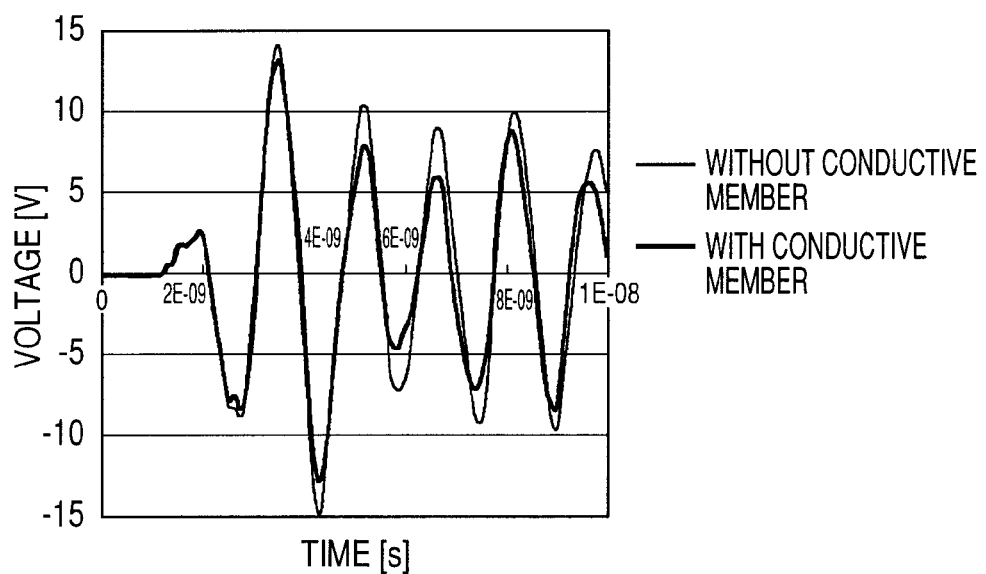

It is assumed that the conductive chassis plate 203 is 15 cm wide (horizontal direction) and 12 cm deep (depth direction), and the first printed circuit board 205 is 15 cm wide and 7 cm deep. Accordingly, the length $L_1$ of the first printed circuit board 205 is 15 cm. Further, the conductive projecting portions 211 and the conductive projecting portions 811 are 0.5 cm high. The termination resistor 209 is 1 kΩ. The first printed circuit board 205 is formed of a two-layer substrate, and the substrate material quality is FR-4 (dielectric constant ∈r=4.8). In this case, the effective dielectric constant $\in_{eff}$ of the first printed circuit board 205 is about 2.8. Further, it is assumed that the second printed circuit board 805 is 15 cm wide and 7 cm deep, and the material quality is FR-4 (dielectric constant ∈r=4.8). In this case, the effective dielectric constant $\in_{eff}$ of the second printed circuit board 805 is about 1.4. The width of the wiring patterns 815 on the second printed circuit board 805 is set to 5 mm. As described above, the length $L_{21}$ of the wiring patterns 815 is obtained by $L_{21} = (2 \times n+1) \times L_1 \times \sqrt{\in_{eff1}}/2 - R\}/\sqrt{\in_{eff2}}$. Therefore, in the case of n=0 where the length of the wiring patterns 815 is smallest, when the respective values are assigned to a right side of the formula, $L_{21} \approx 10.2$ cm is satisfied. Thus, the length $L_{21}$ of the wiring patterns 815 is obtained. In simulation, computation is conducted when $L_{21}=10$ cm. In this example, FIG. 11B illustrates the voltage computation results of the termination resistor 209, when an initial charge value of the electrostatic discharge pulse is set to 5 KV and the electrostatic discharge pulse is applied to the connector 208. The axis of abscissa is a time, and the axis of ordinate is a voltage value. For comparison, the computation results when the projecting portions 811 and the wiring patterns 815 are not connected to one end of the conductive chassis plate 203 are also illustrated in FIG. 11B.

It is understood from the computation results illustrated in FIG. 11B that the induced voltage by the electrostatic discharge pulse when the projecting portions 811 and the wiring patterns 815 are connected to one end of the conductive chassis plate 203 can be suppressed as compared with that when not connected. Accordingly, it is understood that the amplitude of the voltage of the electrostatic discharge pulse is lower and the voltage is lower over the entire pulse duration when the projecting portions 811 and the wiring patterns 815 are connected in the connector 207 of the first printed circuit board 205. As a result, the malfunction in transmitting or receiving the signal can be suppressed even if the electrostatic discharge pulse is superimposed on the signal.

The present invention has been described with reference to the above-mentioned embodiments, but the present invention is not limited to those embodiments. In the above-mentioned first to third embodiments, a case where the conductive members 113, 313, and 513 connected to one end 103a of the conductive chassis plate 103 are formed by bending one end 103a of the conductive chassis plate 103 has been described. However, the present invention is not limited to this configuration. It is possible that the conductive member is formed of another member different from the conductive chassis plate, and one end of the conductive member and one end of the conductive chassis plate are connected to each other by brazing or soldering, or with a conductive screw.

Further, in the first to third embodiments, a case where the conductive member is a flat plate material whose depth dimension is set to be shorter than the dimension of the printed circuit board 105 by the length of two projecting portions 111 has been described. However, the present invention is not limited to this configuration. For example, the conductive member may be a band-like or bar-like member that extends from each of two projecting portions.

Further, in the first to fourth embodiments, a case where the printed circuit board is disposed above the conductive chassis plate and the conductive member is disposed below the conductive chassis plate has been described. However, the upper and lower layout relationship may be inverted. That is, the conductive member may be disposed above the conductive chassis plate, and the printed circuit board may be disposed below the conductive chassis plate. In the fourth embodiment, the upper and lower layout relationship in which the printed circuit board (first printed circuit board) is disposed above the conductive chassis plate and another printed circuit board (second printed circuit board) is disposed below the conductive chassis plate may be inverted. That is, another printed circuit board (second printed circuit board) may be disposed above the conductive chassis plate, and the printed circuit plate (first printed circuit board) may be disposed below the conductive chassis plate.

Further, in the fourth embodiment, the band-like wiring pattern is provided, but the present invention is not limited to this configuration. Any configuration that does not interfere with another wiring pattern may be provided. For example, a solid wiring pattern may be provided.

Further, in the first, second, and fourth embodiments, as countermeasure against the static electricity in the case where the static electricity is discharged to the connector 108 when the memory media M is inserted into the connector 107, a case where the conductive member is provided on the end 103a of the conductive chassis plate 103 has been described. However, the present invention is not limited to this configuration. As the countermeasure in the case where static electricity is discharged to the connector 107 when the memory media is inserted into the connector 108, a conductive member may be provided on the end 103b of the conductive chassis plate 103. In this case, the end 103b is one end, and the end 103a is the other end.

Further, a case where the card type memory media can be inserted into the connector 107 and the USB memory can be inserted into the connector 108 has been described. However, the type of memory media is not particularly limited. That is, the respective connectors may be configured so that the memory media to be used can be inserted into and removed from the respective connectors. Further, a case where the external equipment is a memory media has been described. However, the present invention is not limited to this configuration. For example, the external equipment that is connected to the connector 108 may be formed of a device having the USB connection terminal other than the USB memory, and the respective connectors may be configured so that the external equipment to be used can be inserted into and removed from the respective connectors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-161849, filed Jul. 8, 2009, which is hereby incorporated by reference herein in its entirety.

What is claimed is:

1. An electronic apparatus, comprising: an electronic apparatus main body having a conductive chassis;
   an operating device provided separately from the electronic apparatus main body, for operating the electronic apparatus main body, the operating device comprising:
   a printed circuit board;
   a plurality of connectors for external equipment, which are mounted on both ends of the printed circuit board, respectively, and through which the printed circuit board transmits or receives a signal while the external equipment is connected to at least one of the plurality of connectors;
   a conductive chassis plate which is disposed to face the printed circuit board at a distance, and has one end aligned with one end of the printed circuit board, and is electrically connected to a ground wiring pattern provided on the one end of the printed circuit board; and
   a conductive member which is electrically connected to the one end of the conductive chassis plate, and extends from the one end of the conductive chassis plate toward another end of the conductive chassis plate; and
   a conductive support member which supports the operating device so as to project from the electronic apparatus main body, and electrically connects the conductive chassis and the conductive chassis plate.

2. The electronic apparatus according to claim 1, wherein the conductive chassis plate and the conductive member are integrally formed by bending a single plate.

3. The electronic apparatus according to claim 1, wherein the conductive member comprises a wiring pattern that is provided on another printed circuit board facing the printed circuit board with the conductive chassis plate interposed therebetween, and is electrically connected to one end of the conductive chassis plate.

4. The electronic apparatus according to claim 1, wherein a length of the conductive member is within a range of ±10% of $(2 \times n+1)/4$ wavelength (n is an integer of 0 or larger) at a resonance frequency of an electrostatic discharge pulse that resonates at the printed circuit board.

5. The electronic apparatus according to claim 1, wherein an end of the conductive member in an extending direction is electrically connected to the conductive chassis plate.

6. The electronic apparatus according to claim 5, wherein the end of the conductive member in the extending direction is electrically connected to the another end of the conductive chassis plate.

7. The electronic apparatus according to claim 1, wherein each of the connectors is a memory media connector to and from which a memory media serving as the external equipment is attachable and detachable.

* * * * *